(12) United States Patent
Gopalakrishnan et al.

(10) Patent No.: US 7,984,287 B2
(45) Date of Patent: Jul. 19, 2011

(54) RESOURCE CONFIGURATION IN MULTI-MODAL DISTRIBUTED COMPUTING SYSTEMS

(75) Inventors: Ponani Gopalakrishnan, New Delhi (IN); Stephane H. Maes, Fremont, CA (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 12/272,597

(22) Filed: Nov. 17, 2008

(65) Prior Publication Data

US 2009/0094451 A1    Apr. 9, 2009

Related U.S. Application Data

(63) Continuation of application No. 10/698,101, filed on Oct. 31, 2003, now Pat. No. 7,454,608.

(51) Int. Cl.
G06F 15/177 (2006.01)
G06F 9/24 (2006.01)
G10L 15/00 (2006.01)

(52) U.S. Cl. ............... 713/100; 713/1; 713/2; 704/231
(58) Field of Classification Search .................. 713/1, 2, 713/100; 704/231
See application file for complete search history.

(56) References Cited

U.S. PATENT DOCUMENTS

| | | | |
|---|---|---|---|
| 5,552,806 A | 9/1996 | Lenchick | |
| 6,389,288 B1 | 5/2002 | Kuwahara et al. | |
| 6,408,187 B1 | 6/2002 | Merriam | |
| 6,501,421 B1 | 12/2002 | Dutta et al. | |
| 6,601,012 B1 | 7/2003 | Horvitz et al. | |
| 6,601,073 B1 | 7/2003 | Robare | |
| 6,748,195 B1 * | 6/2004 | Phillips | 455/41.2 |
| 6,801,974 B1 | 10/2004 | Watts et al. | |
| 6,879,838 B2 | 4/2005 | Rankin et al. | |
| 6,912,386 B1 | 6/2005 | Himberg et al. | |
| 7,076,255 B2 | 7/2006 | Parupudi et al. | |
| 7,454,608 B2 * | 11/2008 | Gopalakrishnan et al. | 713/100 |
| 2002/0004412 A1 | 1/2002 | Waters | |
| 2002/0119788 A1 | 8/2002 | Parupudi et al. | |
| 2002/0138598 A1 | 9/2002 | Bade et al. | |
| 2002/0155844 A1 | 10/2002 | Rankin et al. | |
| 2002/0160745 A1 | 10/2002 | Wang | |
| 2002/0198004 A1 | 12/2002 | Heie et al. | |
| 2003/0063728 A1 | 4/2003 | Sibal et al. | |
| 2003/0100315 A1 | 5/2003 | Rankin | |
| 2003/0108003 A1 | 6/2003 | Dietz | |
| 2003/0148775 A1 | 8/2003 | Spriestersbach et al. | |
| 2004/0098571 A1 * | 5/2004 | Falcon | 713/1 |
| 2004/0111482 A1 | 6/2004 | Bourges-Waldegg et al. | |
| 2004/0127198 A1 * | 7/2004 | Roskind et al. | 455/412.2 |
| 2004/0236574 A1 | 11/2004 | Ativanichayaphong et al. | |
| 2005/0085272 A1 | 4/2005 | Anderson et al. | |
| 2005/0197138 A1 * | 9/2005 | Kaminsky et al. | 455/456.1 |
| 2008/0019317 A1 * | 1/2008 | Vellanki et al. | 370/331 |
| 2008/0161034 A1 * | 7/2008 | Akiyama | 455/550.1 |

FOREIGN PATENT DOCUMENTS

| | | |
|---|---|---|
| WO | 8402995 | 8/1984 |
| WO | 02102024 | 12/2002 |

* cited by examiner

*Primary Examiner* — Vincent T Tran
(74) *Attorney, Agent, or Firm* — Ference & Associates LLC

(57) ABSTRACT

A method and system for configuring available resources in real-time to automatically accommodate the needs of the system user in multi-modal distributed computing system is disclosed. Information about the location or environment of a wireless device is used, preferably in combination with user personal preferences and past history to modify the behavior of the wireless device, including the selection of the most appropriate mode of interaction with the device and the activation of applications thereon as appropriate.

17 Claims, 2 Drawing Sheets

RESOURCE CONFIGURATION IN MULTI-MODAL DISTRIBUTED COMPUTING SYSTEMS

CROSS REFERENCE TO RELATED APPLICATION

This application is a continuation application of U.S. patent application Ser. No. 10/698,101 filed on Oct. 31, 2003 now U.S. Pat. No. 7,454,608, the contents of which are hereby fully incorporated by reference.

FIELD OF THE INVENTION

The present invention relates to multi-modal distributed computing systems and, more specifically, to configuring available resources in real-time to automatically accommodate the needs of the system user.

BACKGROUND OF THE INVENTION

There are many types of wireless mobile devices being used in the world today including mobile phones, personal digital assistants ("PDAs"), hand-held devices, and combinations of these devices. Wireless transport networks and wireless local area networks allow electronic content to flow to and from these mobile devices. With the growing popularity of mobile devices, mobile information access and remote transactions are fast becoming commonplace. However, mobile devices impose their limitations on the end user experience. For example, mobile phones have relatively small visual displays and a cumbersome keypad input. PDAs have better visual displays, but have the same input limitations. As devices become smaller, modes of interaction other than keyboard and stylus are a necessity. One such alternative is the use of multimodal access methods.

Multichannel access is the ability to access enterprise data and applications from multiple methods or channels such as a phone, laptop or PDA. The term "channel" refers to the different browsing platforms or user agents that access, browse, and interact with online applications. Multichannel applications are designed for universal access across different channels, one channel at a time, with no particular attention paid to synchronization or co-ordination among the different channels. A user has an array of channels with which to access content, which appears separate but functional and consistent. For example, a user may access his or her bank account balances on the Web using Microsoft® Internet Explorer when in the office or at home and may access the same information over a dumb phone using voice recognition and text-to-speech when on the road.

By contrast, multimodal access is the ability to combine multiple modes or channels in the same interaction or session. The methods of input include speech recognition, keyboard, touch screen, and stylus. Depending on the situation and the device, a combination of input modes will make using a small device easier. For example, in a Web browser on a PDA, a user can select items by tapping or by providing spoken input. Similarly, a user can use voice or stylus to enter information into a field. With multimodal technology, information on the device can be both displayed and spoken. This can be especially important in automobiles or other situations where hands and eyes free operation is essential.

Multimodal applications represent the convergence of content—video, audio, text and images—with various modes of user interface interaction. This enables a user to interact with an application in a variety of ways, for example: input with speech, a keyboard, keypad, mouse and/or stylus, and output such as synthesized speech, audio, plain text, motion video and/or graphics.

The term "mode" denotes a mechanism for input and output to a user interface. A user can employ each of these modes independently or concurrently. Multimodal applications incorporate any number of modes simultaneously so a user can vocalize his/her name, type in an address, send a phone number from a wireless handset—all within the same session, form, and application context. The browser will typically let a user select the most appropriate mode of interaction based on the user's situation, activity, or environment.

The different modes may be supported on a single device or on separate devices working in tandem. When separate devices work in tandem, this is typically referred to as distributed multi-modal computing. An example of distributed multi-modal computing is a user is talking into a cell phone and seeing the results on a PDA. Voice may also be offered as an adjunct to browsers with high resolution graphical displays, providing an accessible alternative to using the keyboard or screen.

Multimodal applications are an improvement over multichannel applications. Advantages of multimodal applications include: multimodal interfaces improve the usability of data services such as weather, driving directions, stock quotes, personal information management, and unified messaging; Application Service Providers can offer users a wider range of personalized and differentiated offerings using multimodal interfaces; many call center applications and enterprise data services such as account management, brokerage accounts, customer service, and sales force automation offer voice-only interfaces and multimodal interfaces added to these applications enhance a users experience; with multimodal interfaces, a user can easily access and enter information, especially when using small devices by combining multiple input and output devices; multimodal applications improve a users experience with mobile devices and encourage the growth and acceptance of m-Commerce; a user need not be constrained by the limitations of a particular interaction mode at any given moment, for example, while listening to instructions on a Voice browser, a user is constrained by the ephemeral nature of the interface; a user may wish to listen to the instructions again; multimodal interfaces give a user the flexibility to choose the most convenient interaction mode that suits the task and purpose; they can also exploit the resources of multiple interfaces in order for a user to have an enhanced computing experience.

Users of multimodal interfaces, however, do face certain issues. These issues include ergonomic issues and appropriateness. Ergonomic issues may arise as a user switches from one mode to another, such as alternating between listening and watching. Appropriateness issues are in the nature of a user disabling speech input and output when this would be distracting to nearby people. Considering all of the various issues, however, a user must still select the most appropriate mode of interaction based on the user's situation, activity, or environment.

SUMMARY OF THE INVENTION

In accordance with at least one presently preferred embodiment of the present invention, there is broadly contemplated a system and method in which information about the location or environment of a wireless device is used, preferably in combination with user personal preferences and past history, to modify the behavior of the wireless device.

In summary, one aspect of the invention provides a system for resource configuration in a multi-modal distributed computing system having at least one resource capable of being configured, the system comprising: an arrangement for obtaining information associated with a context of use of a mobile device within the system; an arrangement for obtaining information associated with the system; and an arrangement for configuring said at least one resource based upon the information associated with the context of use of the mobile device and the system.

Another aspect of the present invention provides a method for resource configuration in a multi-modal distributed computing system having at least one resource capable of being configured, the method comprising the steps of: obtaining information associated with a context of use of a mobile device within the system; obtaining information associated with the system; configuring said at least one resource based upon the information associated with the context of use of the mobile device and the system.

Furthermore, an additional aspect of the invention provides a program storage device readable by machine, tangibly embodying a program of instructions executable by the machine to perform a method for resource configuration in a multi-modal distributed computing system having at least one resource capable of being configured, the method comprising the steps of: obtaining information associated with a context of use of a mobile device within the system; obtaining information associated with the system; configuring said at least one resource based upon the information associated with the context of use of the mobile device and the system.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
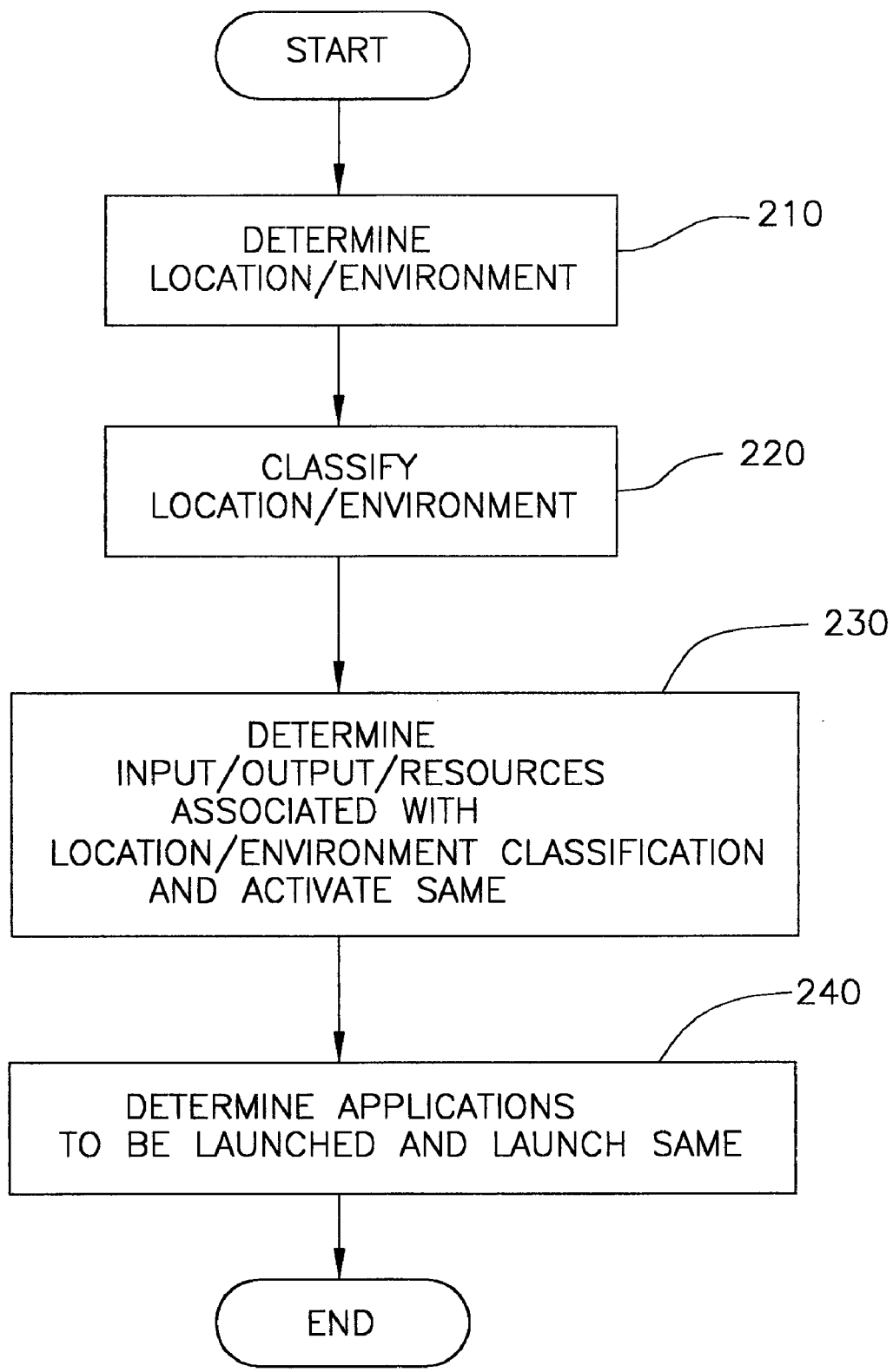
FIG. 1 is a flow chart of a method in accordance with the present invention.

In accordance with the present invention, information about the location or environment of the wireless device is used, preferably in combination with user personal preferences and past history to modify the behavior of the wireless device, including the selection of the most appropriate mode of interaction with the device and the activation of applications thereon as appropriate.

The environment the wireless device is located in may be established in a number of ways, and may include the actual physical location of the device or the location of the device relative to other devices, resources, etc. For example, a number of wireless devices now include the ability to determine its position using the Global Positioning System (GPS). In fact, the use of GPS is mandated for certain wireless devices by the United States Government, e.g., cell phones. The environment of the device may also be established based upon the proximity to or use by the device of a wireless network. For example, by the wireless device entering a local network (e.g., a Bluetooth piconet). The location of the wireless device may also be based upon a scheduled future location. It should be understood the present invention includes the use of establishing the location of the wireless device in any manner, and not just in accordance with the examples set forth herein.

Once the environment the wireless device is located in has been established, the behavior of the wireless device is appropriately modified. Behavior may be modified in any number of ways. It is presently preferred, however, that modification occur based on a combination of two items. The first is whether or not a user has indicated that a certain modification, whether it be the launch of an application or otherwise, is to occur at a particular moment. The second is the preference of the user, as determined through past instructions as well as the history of the modifications, including applications and queries, that were launched by the user in the same or similar location.

Given the number of environments a wireless device may encounter over time, it is presently preferred that any past instructions and historical modifications be associated with the following specific situations: Office, Local on the road, Remote business site, Local business office, Teleconference, Conference room, Commute, On the road between business office and remote business site, Business trip, and Abroad. It should be understood, however, that past instructions and historical modifications may be associated with any number of situations, including particular situations favored by a user. Association with specific situations may be accomplished without user intervention, either by the wireless device itself or otherwise. In any event, it is presently preferred that a user's ability to associate an environment with a specific situation not be precluded.

The preference of the user may also be determined exclusively through the use of historical data without reference to an association to any specific situation. Doing so, however, increases the computational resources needed at the triggering event to determine the appropriate modifications to the behavior of the wireless device. Given the nature of mobile wireless devices, the availability of computational resources may very well be at a premium.

As discussed herein, the information interaction needs of a user in a multi-modal distributed computing environment are often influenced by the location, device, available resources and other environmental factors. The following are non-limiting examples of how such information interaction needs may be so influenced in accordance with the present invention. A user with an audio-only device such as a mobile phone may wish to temporarily use a display resource (such as a monitor in a lounge or a conference room, or an in-seat display on an aircraft) to look at video information. A user driving a car may be interested in getting some traffic or weather information, and may be interested in getting the information downloaded to an accessible device or may wish to make reservations for network resources to access the information. A user entering a new building may wish to have information such as restroom locations downloaded to a personal device immediately upon entrance. A traveler entering the airport check-in may wish to have information about departure gate changes downloaded to an accessible device. A user may wish to have only urgent messages made available (by email or otherwise) when the user is travelling, but want to have all messages made available when not travelling. Similarly, a user may want to skip over any messages containing material if the user is in a public place. A user may desire a device with audio to be verbose outside of a vehicle, but not as verbose when the user is in a vehicle. There are also numerous other ways in which information interaction needs may be so influenced In another embodiment of the present invention, the behavior of the wireless device is appropriately modified based upon actions initiated by or preferences of others, such modification not having been selected by the user of the wireless device, e.g., the modification having been initiated externally of the wireless device being modified. Others may include other users of wireless devices within the environment or the person or persons exercising control over the environment in which the wireless device is located.

Once such example is where the location of a meeting has been changed. In this circumstance, the requester or initiator of the meeting may initiate a behavior modification of wireless devices to notify people the meeting location has been changed. Such notification may include the new meeting location, and the notification may be provided when reaching the building, floor or room, depending on network configuration and whether the identity of the attendees is known. If the identity of the attendees is known and their wireless devices can be identified, the attendees may be notified at the earliest possible opportunity, e.g, upon arrival at the building or earlier. Otherwise, all wireless devices entering a defined environment, e.g., the conference room, may be informed of the change in location.

Such a forced behavior modification may also be utilized in other appropriate circumstances. Examples of such situations include emergency situations, and may also include situations previously discussed with respect to user preferences. Should an emergency situation occur and impact an environment, either directly or indirectly, the person or persons exercising control over the environment in which the wireless device is located may provide notification of the existence of the emergency situation and optionally, instructions on dealing with the emergency situation. Another example of a circumstance in which a forced behavior modification may be utilized is when the person or persons exercising control over the environment in which the wireless device is located determine a particular behavior is appropriate for all wireless devices within the environment. An example of such behavior may be no voice interaction—which would be appropriate for a church, auditorium, or similar environment.

Referring now to FIG. 1, a flow chart of the method in accordance with one embodiment of the present invention is shown. At step 210, the location of the user is established. Once the user's location is obtained, at step 220, it is appropriately classified into any number of pre-selected classifications or locations, which may include office, home, or meeting. Next, at step 230, the location classification is used to look up the user's preferences for input, output, and associated resources. Once the preferences are obtained, the appropriate input, output, and resources are activated. At step 240, the appropriate applications are determined and launched according to user's preferences for the location classification. It will be appreciated that the invention contemplates that steps and 240 may be interchanged or performed simultaneously. Preferably, steps and 240 are performed simultaneously. Additionally, the preferences at steps 230 and 240 may be obtained from a database of historical keystrokes and queries or may be obtained from a database of preferences for a given location classification. In at least one embodiment, the user may choose to have certain input, output, resources, and applications launch based upon the day and time. Thus, it will be appreciated that the user's context may be in relation to geographic location, day, time, available resources or any other relevant context for selecting appropriate input, output, resources, and applications.

Figure 2:
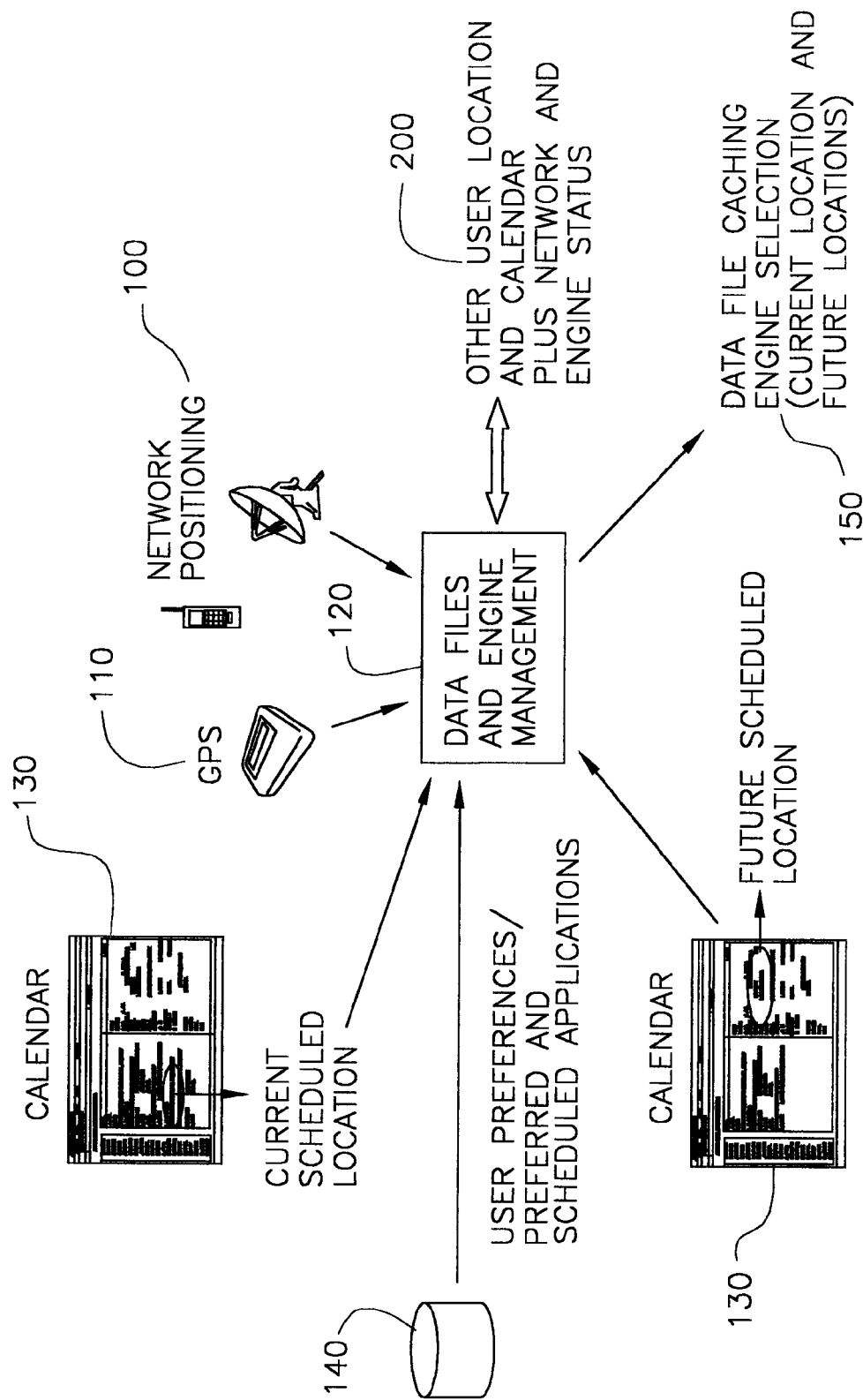
FIG. 2 is a block diagram of the implementation of a system in accordance with the present invention.

Referring now to FIG. 2, a block diagram of the system according to the present invention is depicted. Upon first users' entry into the local network, the information of the first user 100 is transmitted to the network controller 120; alternatively, network controller 120 may obtain the location of user 100 through GPS 110. Network controller 120 accesses database 140 to determine the preferences of user 100 for applications and functions to be launched based upon location. Once the preferences are obtained, network controller 120 launches the appropriate applications or functions at 150. The network controller may then store the history of this activity in database 140 to be consulted at a later time.

In another embodiment, network controller 120 accesses database 140 to determine the preferences of user 100 for applications and functions given the date and time. Once the preferences are obtained, network controller 120 launches the appropriate applications and functions at 150. The network controller may then store the history of this activity in database 140 to be consulted at a later time.

It will be appreciated that this same system and process may be made available to user 200. Further, the geographic and calendar information of multiple users may be coordinated by the network controller 120 so as to automatically reschedule or relocate a meeting based upon geographic information and resource availability of the multiple users. The information about the new date, time, and location and the meeting may then be transmitted to multiple users through the network controller 120.

It is to be understood that the present invention, in accordance with at least one presently preferred embodiment, includes an arrangement for obtaining information associated with a mobile device within the system; an arrangement for obtaining information associated with the system; and an arrangement for configuring at least one resource based upon the information associated with the mobile device and the system, which may be implemented on at least one general-purpose computer running suitable software programs. It may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for resource configuration in a multi-modal distributed computing system having at least one resource capable of being configured, the system comprising:
    an arrangement for obtaining information associated with a context of use of a mobile device within the system;
    an arrangement for obtaining one or more preferences of a user for applications and functions to be launched based on a location of the mobile device;
    an arrangement for obtaining information associated with the system;
    and
    an arrangement for configuring an interface to provide the most appropriate mode of interaction for a user of the mobile device within the system.

2. The system according to claim 1, wherein said information associated with the context of use of the mobile device includes contextual information associated with the needs of the user of the mobile device, the location of the mobile device, and stored user preferences.

3. The system according to claim 1, wherein the at least one resource to be configured is an information resource.

4. The system according to claim 1, wherein said information associated with the system includes information associated with characteristics of the environment in which the system is located.

5. The system according to claim 4, wherein said characteristics of the environment in which the system is located are current characteristics.

6. The system according to claim 1, wherein the at least one resource to be configured is a computing resource.

7. The system according to claim 6, wherein the computing resource is an application.

8. The system according to claim 7, wherein the application has multiple configurations and the application is configured to be most appropriate for the environment of use in which the mobile device is located.

9. A method for resource configuration in a multi-modal distributed computing system having at least one resource capable of being configured, the method comprising the steps of:
obtaining information associated with a context of use of a mobile device within the system;
obtaining one or more preferences of a user for applications and functions to be launched based on a location of the mobile device;
obtaining information associated with the system; and
providing the most appropriate mode of interaction for a user of the mobile device within the system.

10. The method according to claim 9, wherein said information associated with the context of use of the mobile device includes contextual information associated with the needs of the user of the mobile device, the location of the mobile device, and the environment in which the mobile device is located.

11. The method according to claim 9, wherein the at least one resource to be configured is an information resource.

12. The method according to claim 9, wherein said information associated with the system includes information associated with characteristics of the environment in which the system is located.

13. The method according to claim 12, wherein said characteristics of the environment in which the system is located are current characteristics.

14. The method according to claim 9, wherein the at least one resource to be configured is a computing resource.

15. The method according to claim 14, wherein the computing resource is an application.

16. The method according to claim 15, wherein the application has multiple configurations and the application is configured to be most appropriate for the environment in which the mobile device is located.

17. A non-transitory program storage device readable by machine embodying a program of instructions executable by the machine to perform resource configuration in a multi-modal distributed computing system having at least one resource capable of being configured, the resource configuration comprising:
obtaining information associated with a context of use of a mobile device within the system;
obtaining one or more preferences of a user for applications and functions to be launched based on a location of the mobile device;
obtaining information associated with the system; and
providing the most appropriate mode of interaction for a user of the mobile device within the system.

* * * * *